(12) United States Patent
Freitag

(10) Patent No.: US 9,093,768 B1
(45) Date of Patent: Jul. 28, 2015

(54) ONE-PIECE FUSIBLE BATTERY TERMINAL CLAMP

(71) Applicant: Royal Die & Stamping Co., Inc., Carol Stream, IL (US)

(72) Inventor: Erik Freitag, Arlington Heights, IL (US)

(73) Assignee: Royal Die & Stamping Co., Inc., Carol Stream, IL (US)

( * ) Notice: Subject to any disclaimer, the term of this patent is extended or adjusted under 35 U.S.C. 154(b) by 44 days.

(21) Appl. No.: 14/181,355

(22) Filed: Feb. 14, 2014

(51) Int. Cl.
*H01R 13/68* (2011.01)
*H01R 11/28* (2006.01)

(52) U.S. Cl.
CPC .................................... *H01R 11/281* (2013.01)

(58) Field of Classification Search
CPC ....................................................... H01R 13/68
USPC ...................... 439/620.27; 337/161, 164, 290
See application file for complete search history.

(56) References Cited

U.S. PATENT DOCUMENTS

| | | | | |
|---|---|---|---|---|
| 6,476,705 B1 * | 11/2002 | Betti et al. | ..................... | 337/161 |
| 6,512,443 B1 * | 1/2003 | Matsumura et al. | ........... | 337/189 |
| 7,077,704 B2 * | 7/2006 | Ikeda et al. | ..................... | 439/627 |
| 7,189,122 B2 | 3/2007 | Freitag | | |
| 7,597,595 B2 * | 10/2009 | Ohashi et al. | ................. | 439/766 |
| 7,695,326 B1 | 4/2010 | Freitag | | |
| 8,337,251 B2 * | 12/2012 | Ecker | ....................... | 439/620.27 |
| 8,382,525 B2 | 2/2013 | Shiraki | | |
| 8,821,190 B2 * | 9/2014 | Matsumura et al. | ..... | 439/620.27 |

OTHER PUBLICATIONS

Photos of multi-piece fuse blocks manufactured by Delphi & Yazaki. First aware of product Aug. 2012.

\* cited by examiner

*Primary Examiner* — Phuong Dinh
(74) *Attorney, Agent, or Firm* — McDermott Will & Emery LLP

(57) ABSTRACT

The invention is directed to a one-piece fusible battery clamp, the clamp being for use with the storage battery of a motor vehicle. The one-piece clamp includes a clamp portion and a spaced-apart, bolt-free planar support portion. The planar support portion has a topside and an underside. The topside of the planar support portion is sufficiently large to support at least one first terminal for accommodating a fuse holder, and at least one second terminal. The planar support portion is further configured to permit contact along the majority of its underside portion with an adjacent, corresponding planar support wall.

6 Claims, 7 Drawing Sheets

ONE-PIECE FUSIBLE BATTERY TERMINAL CLAMP

TECHNICAL FIELD

The invention relates to a one-piece fusible battery terminal clamp, which may be used to accommodate fuses, and is for use with automobiles and other motor vehicles.

BACKGROUND

Electricity is necessary for the operation of most major powered systems and subsystems of modern automobiles and other motor vehicles. The systems and subsystems include, but are not limited to alternators, heaters, starter motors, and other miscellaneous accessories which require electrical power.

The electricity for such systems and subsystems is stored in a common electrical storage battery. The most common electrical storage battery used in the United States has a twelve-volt rating. The storage battery has two main functions. First, it dispenses electrical current to these systems and subsystems. Second, it is recharged by an alternator, or in some cases by a regenerative braking system.

Modern vehicles increasingly rely upon advanced circuit protection devices, such as fuses or fusible links. Fuses and fusible links are typically placed in a fuse box that is located on and secured to a wall, and at an accessible location in the interior of the car or under the hood.

Auto manufacturers have tended to install the fuses and fusible links for larger amperage systems and subsystems, such as alternator, heaters, and starter motors, at or near the battery clamp. In some cases, clamp manufacturers have accommodated these fuses by installing them into a discrete fuse holder, and then bolting that fuse holder onto or near the clamp. The fuse holders are bolted onto the fuse clamps in any one of several planes. As a result, the clamp/fuse holder combination is bulky and somewhat unbalanced. In other cases, clamp manufacturers have simply concluded that the placement of a fuse on a particular clamp configuration, to protect critical components, was simply unfeasible.

The bolted structure that retains the fuse holder also includes a terminal. The terminal is connected by wires to various components, including the heaters, alternators, starter motors, and other systems and subsystems. In this way, a circuit is completed between the battery, clamp, fuse, and the component.

All of these wires, fuse holders, and bolts add weight to the structure secured to and surrounding the battery clamp. In addition, because the bolted fuse holders are positioned in various planes, those holders are not supported by the wall of the battery, or by any other solid surface. As a result, the fuse holders are subject to vibration. Over an extended period of time, such vibration can cause a loosening of the bolts that secure the holder to the clamp. In addition, the combination of excessive weight and the unbalanced structure can cause stress fractures or breaks. In extreme cases, the long-term vibration and the excessive, unbalanced weight can result in a loosening and displacement of the battery post to which the clamp is secured. The displacement of the post can result in the destruction of the battery.

The present invention is designed to remedy the problems of the above-described structures. Its single-piece design is intended to provide for a more direct connection between the battery and the powered components. This connection improves overall electrical performance by lowering resistance, lessening the total number of parts required, and increasing overall robustness.

DETAILED DESCRIPTION

Figure 1:
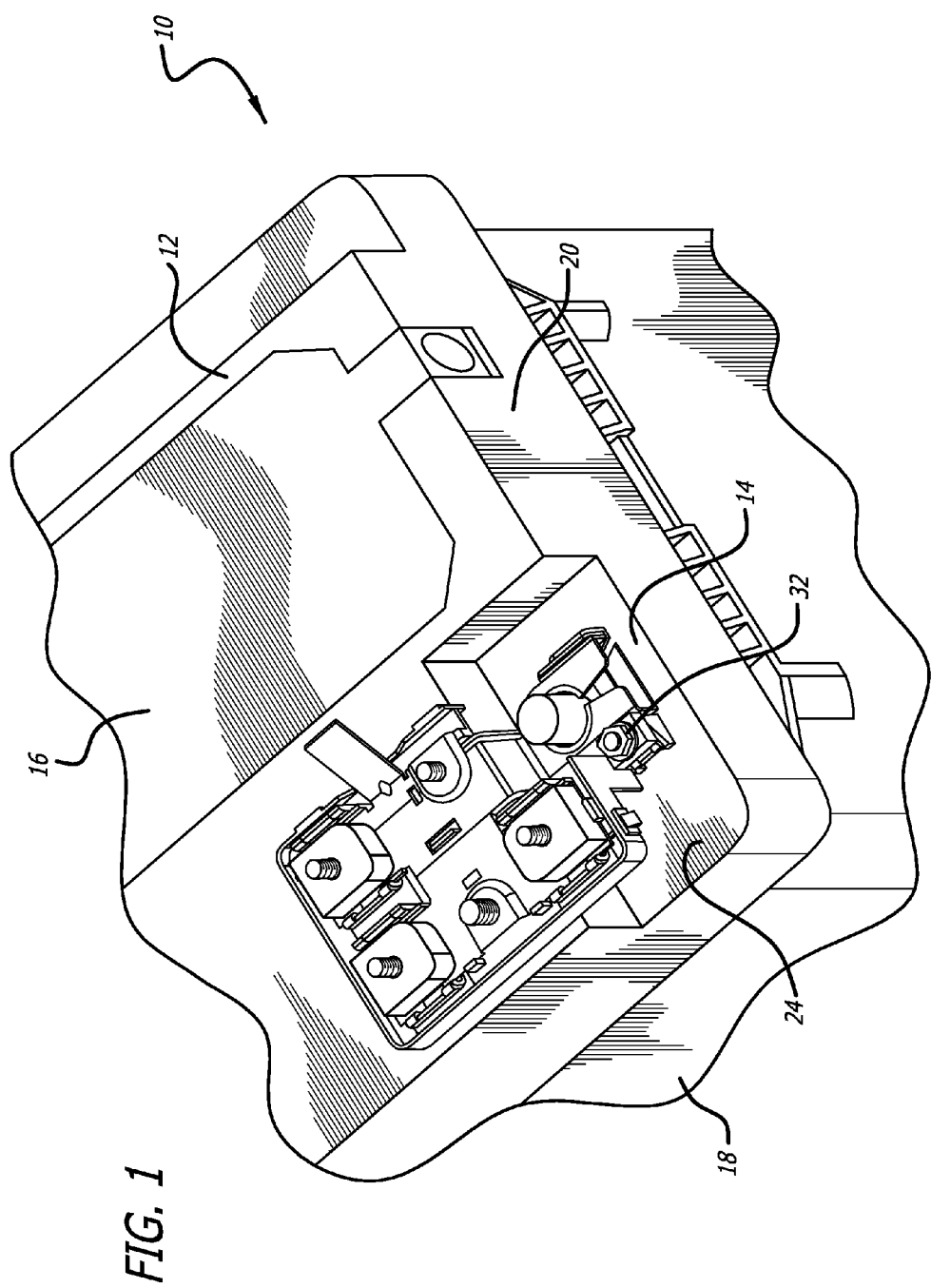
FIG. 1 is a perspective view of a one-piece fusible battery clamp in accordance with one embodiment of the invention, secured to a conventional twelve-volt storage battery for a motor vehicle, and with a plastic, see-through overcap.

FIG. 1 shows a conventional, cube-shaped twelve-volt storage battery 10 for a vehicle. The external battery case 12 of the storage battery 10 may be made of a high-impact plastic, and the interior portion (not shown) of the battery 10 may include lead plates and acid.

In the present embodiment, the battery case 12 includes an indented portion 14. This indented portion 14 is essentially a cut-out area, formed by removing portions of the top wall 16, front wall 18, and side wall 20 of the battery case 12.

Figure 2:
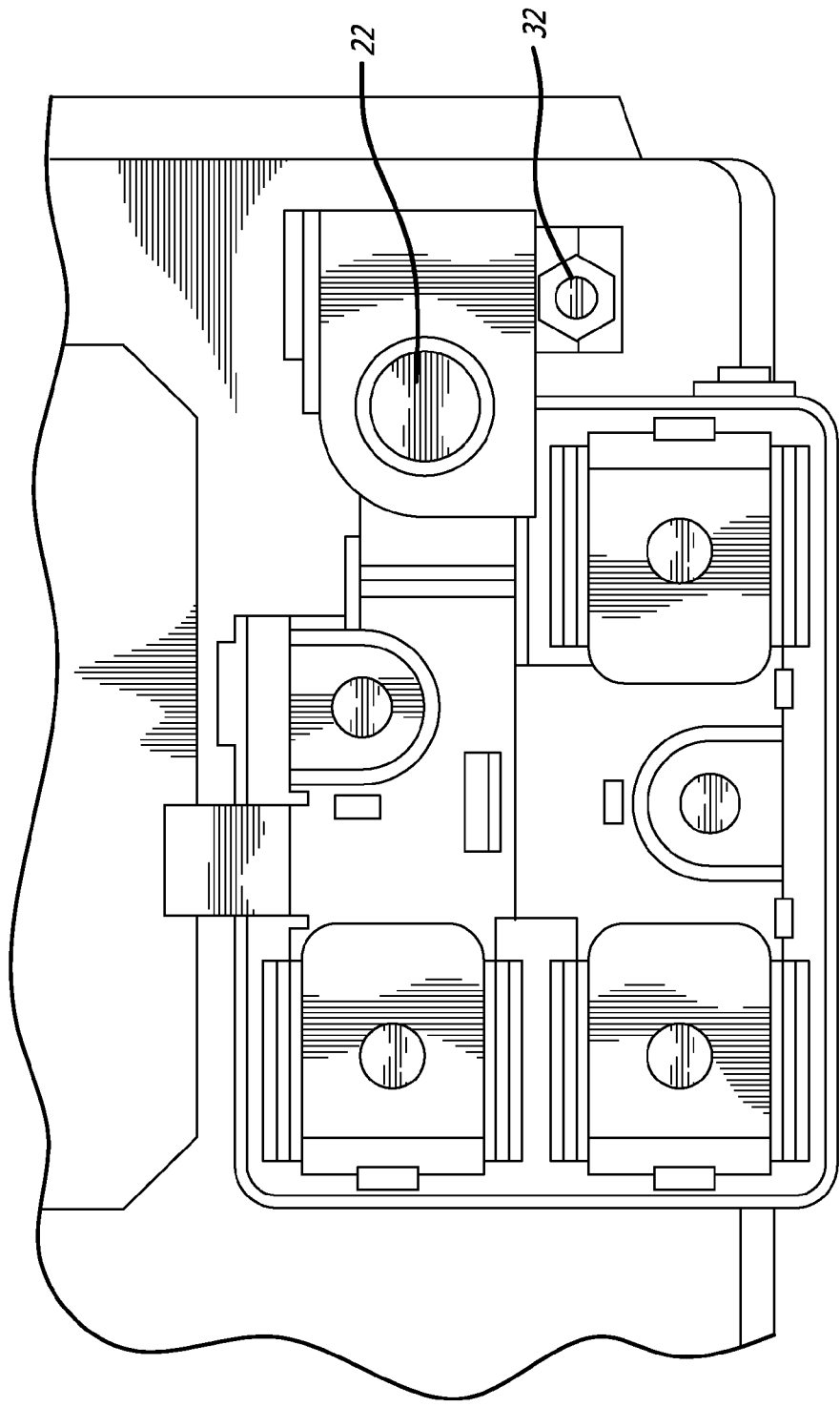
FIG. 2 is a top view of the structure of FIG. 1.

As may best be seen in FIGS. 1 and 2, a conventional, vertically-disposed battery post 22 sits atop a base wall 24 of this indented portion 14. The storage battery 10 also includes a second battery post (not shown). As may be seen in FIG. 1, when the storage battery 10 is secured in its normal configuration within a vehicle, the base wall 24 of this indented portion 14 is positioned below the top wall 16 of the battery case 12.

A one-piece fusible battery clamp is formed of a single conductive piece. This single conductive piece is a blank 26, preferably made of and stamped from a single piece of metal. The blank 26 is shown in FIG. 3.

Figure 3:
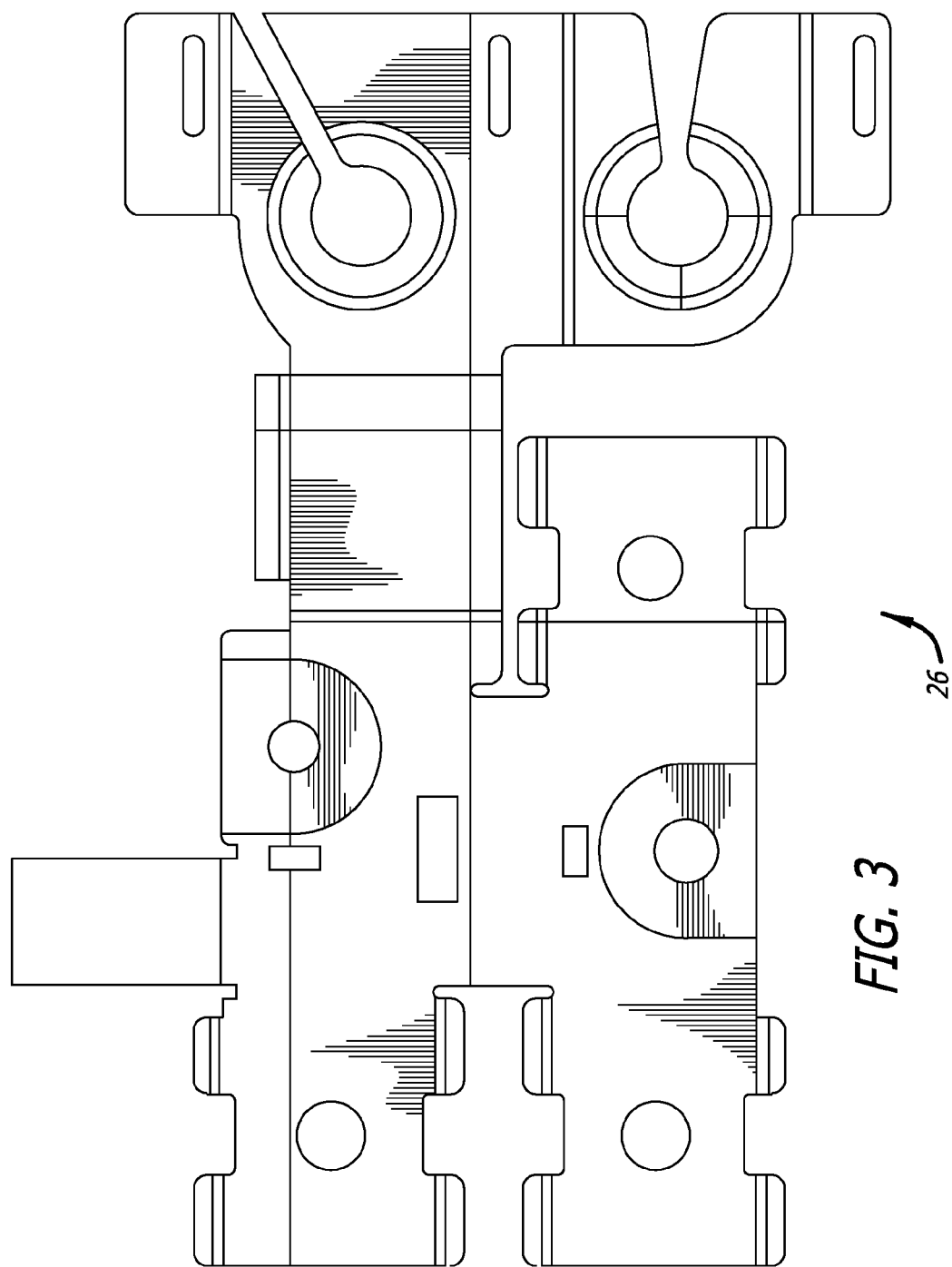
FIG. 3 is a top view of a metal blank used for the formation of a one-piece fusible battery clamp, in accordance with the invention.
Figure 4:
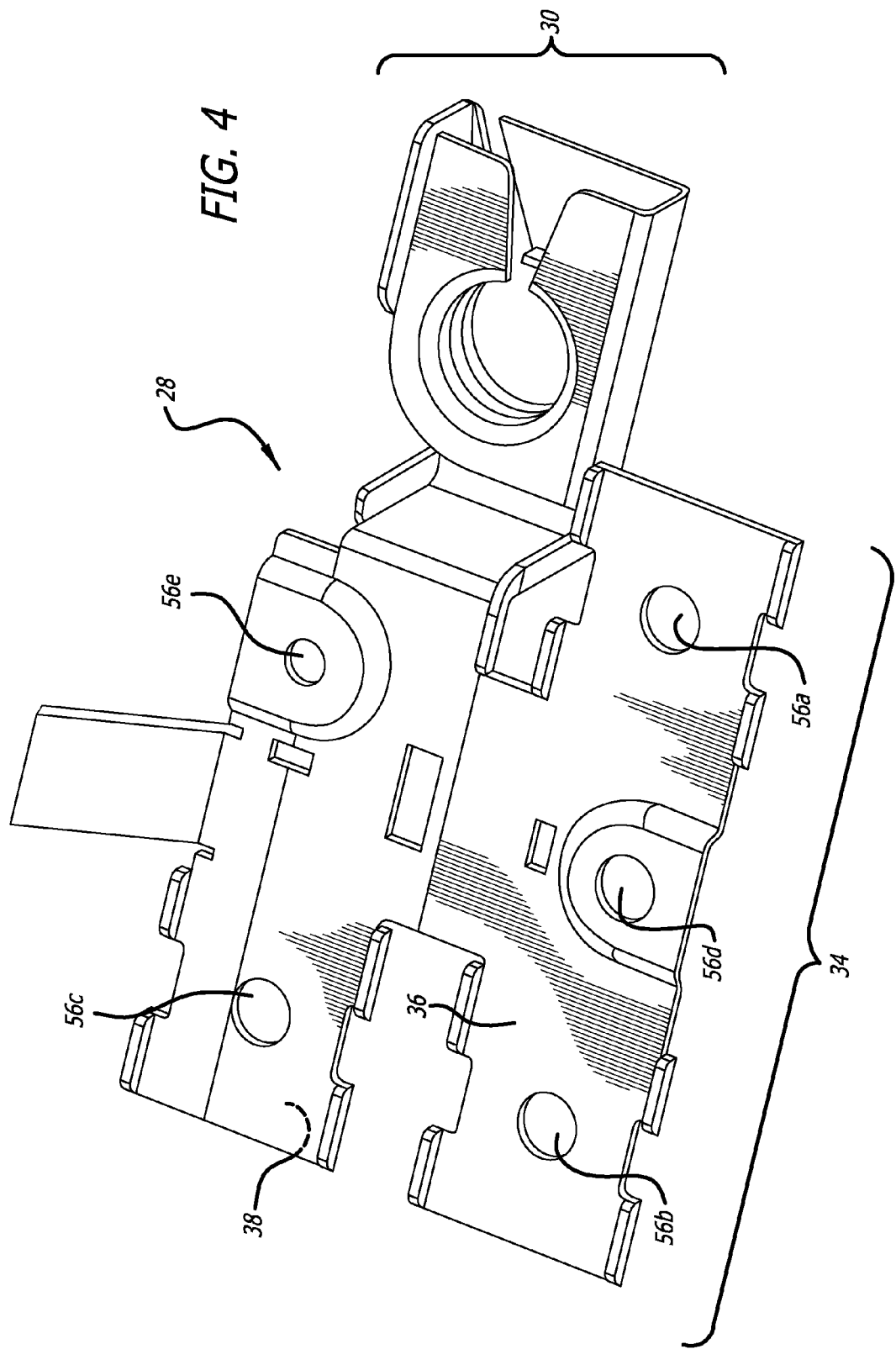
FIG. 4 is a perspective view of the metal blank of FIG. 3, after that blank has been folded and stamped to form the one-piece fusible battery clamp of the invention.

The blank 26 of FIG. 3 is then folded and stamped in a conventional manner, well-known in the metal stamping trade. After folding and stamping is completed, the blank 26 becomes the one-piece fusible battery clamp 28 of the invention. A perspective view of the battery clamp 28 of the invention is shown in FIG. 4.

The one-piece fusible battery clamp 28 of the invention includes two main portions. As may be seen in FIG. 4, the first portion is a clamp portion 30. This clamp portion 30 secures the battery clamp 28 of the invention to the battery post 22. As may be seen in FIGS. 1 and 2, a completely separate tightening bolt 32 is may be inserted into the clamp portion 30. This tightening bolt 32 may be rotated in a counterclockwise and clockwise direction.

As is conventional, when rotated in a counterclockwise direction, the bolt 32 permits an increase in the effective diameter of the clamp portion 30, so as to facilitate its removal from the battery post 22. When rotated in a clockwise direction, the bolt 32 causes a decrease in the effective diameter of the clamp portion 30, tightening the clamp portion 30 on the battery post 22.

The second portion of the one-piece fusible battery clamp 28 of the invention is spaced-apart from the clamp portion 30. As may be seen in FIG. 4, this second portion is a bolt-free planar support portion 34. The elimination of bolts from this planar support portion 34 has two main functions. First, it lowers the weight of the planar support portion 34. Second, it may also lower electrical resistance in the circuits between the storage battery 10 and the power-consuming systems and subsystems. As a result, the combined one-piece fusible battery clamp 28 of the invention is less likely to suffer from weight imbalances, and from the resulting potential for the breakage or stress fractures in that clamp 28.

The planar support portion 34 has a topside 36 and an underside 38. As may best be seen in FIG. 4, the topside 36 of the planar support portion 34 must have adequate surface area to support different terminals, serving different purposes.

Figure 5:
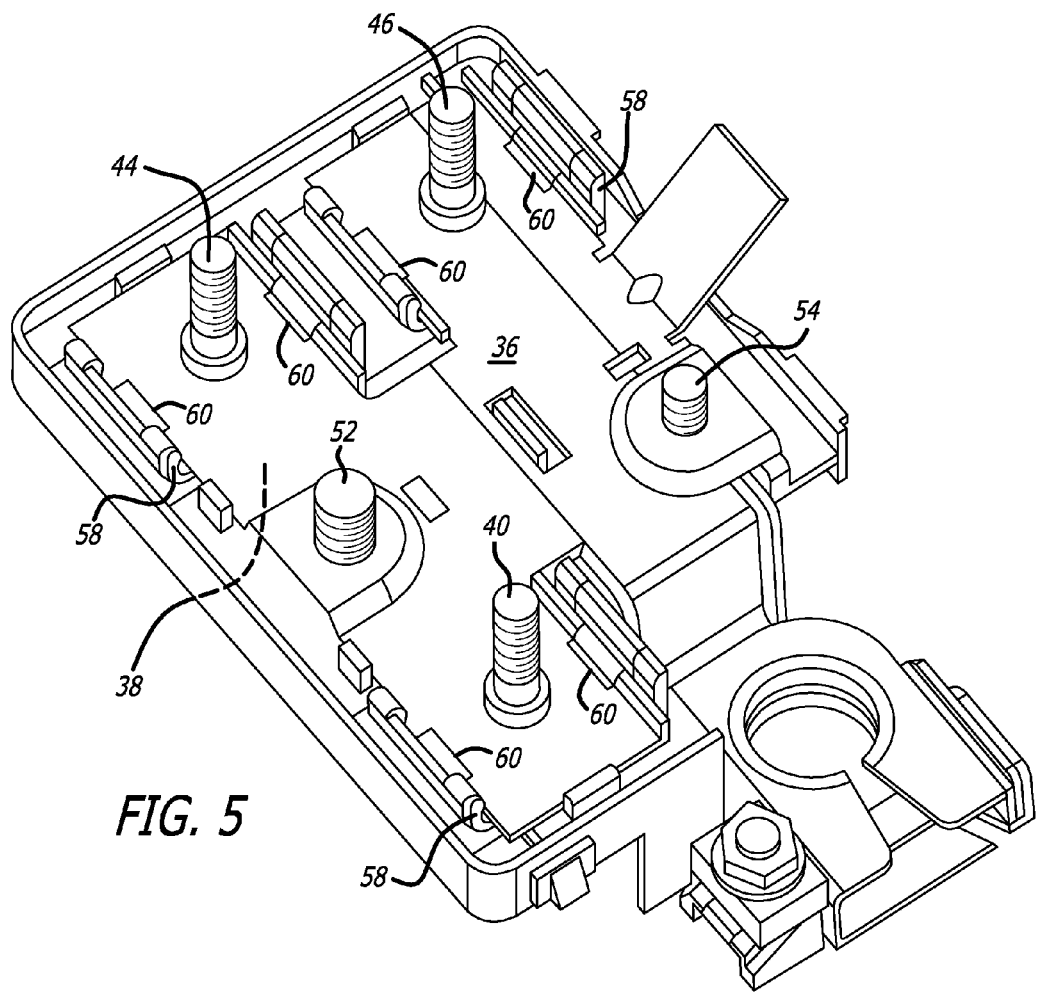
FIG. 5 is a perspective view of the one-piece fusible battery clamp of FIG. 4, but with added first and second terminals.
Figure 6:
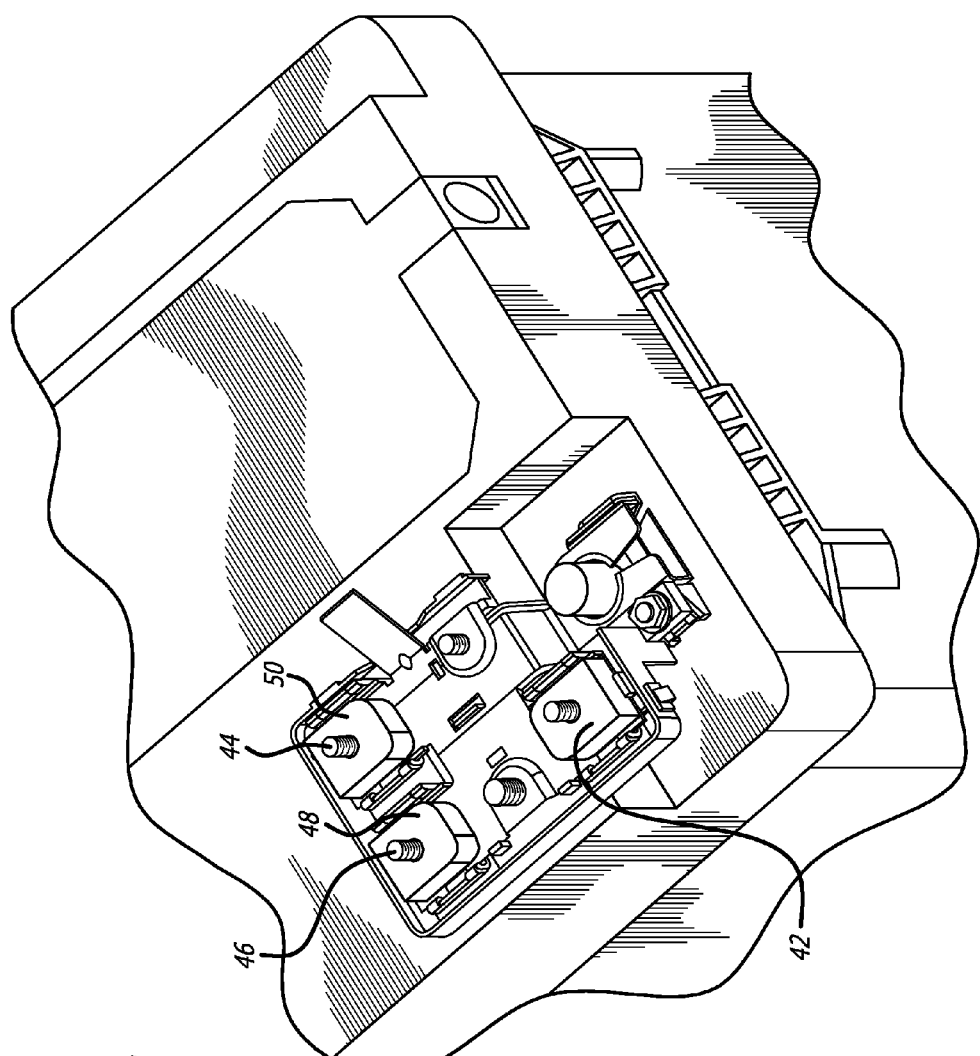
FIG. 6 is a perspective view of the one-piece fusible battery clamp of FIG. 5, but with added fuse holders.
Figure 7:
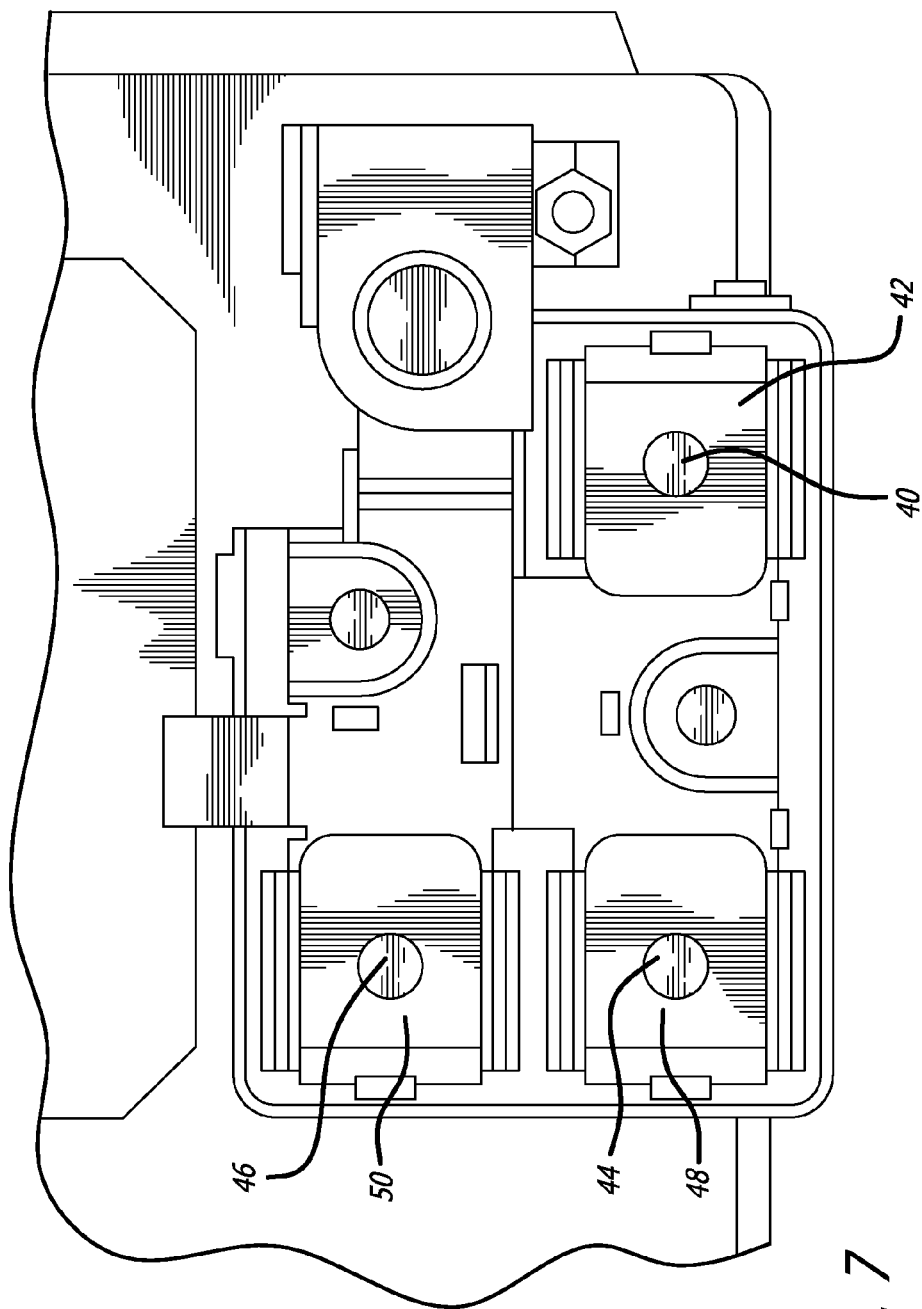
FIG. 7 is top view of the one-piece fusible battery clamp of FIG. 5, but with added fuse holders.

Particularly, as may be seen in FIGS. 5-7, the topside 36 of planar support portion 34 must be sufficiently large to support at least one first terminal 40. This first terminal 40 is used to secure a fuse holder 42 to the topside 36 of the planar support portion 34. In the particular embodiment of FIG. 7, the topside 36 of the planar support portion 34 accommodates three such first terminals 40, 44, and 46, to support three fuse holders 42, 48, and 50, respectively.

Preferably, each of the first terminals 40, 44, and 46 are threaded rods, made of a conductive metal.

These fuse holders 42, 48, and 50 include fuses (not shown) for the protection of high amperage systems and subsystems of the automotive electrical system. These systems and subsystems may include, but are not limited to, heaters, alternators, and starter motors.

In the embodiment of FIGS. 5-7, the topside 36 of the planar support portion 34 includes at least one second terminal 52. Each such second terminal 52 is typically a threaded rod. In the present embodiment, two second terminals 52 and 54 are provided. These second terminals 52 and 54 are used to provide auxiliary power to such devices as winches, entertainment units, or snowplows.

As may best be seen in FIG. 5, the underside 38 of the planar support portion 34 is further configured to permit contact of the majority of the underside 38 with an adjacent, corresponding planar support wall.

Preferably, the corresponding planar support wall is the top wall 16 of the vehicular storage battery 10.

Alternatively, the planar support wall could be a relatively flat surface, such as a flat, under-hood automotive surface. Such an under-hood surface may be a flat surface adjacent the battery 10, such as for example near a wheel well. Either type of planar support wall prevents the weight of the components secured to the topside of the planar support portion 34 from creating high stress loadings on the planar support portion 34.

As may be seen in FIG. 4, the planar support portion 34 of the one-piece fusible battery clamp 28 includes at least one orifice. In the embodiment of FIG. 4, five orifices 56a, 56b, 56c, 56d, and 56e are included. As may best be seen by a comparison of FIG. 4 to FIG. 5, these orifices 56a, 56b, 56c, 56d, and 56e facilitate the positioning the first terminals 40, 44, 46 and the second terminals 52 and 54, respectively.

As may be seen in FIG. 5, the first terminals 40, 44, and 46 are each housed in generally C-shaped support elements 58. The base of each such first terminal 40, 44, and 46 is secured to the top surface of its respective C-shaped support element 58.

Each of the three C-shaped support elements 58 is secured by a snap-fit connection to the planar support portion 34. Particularly, for example, the first terminal 40 is moved upward through its respective orifice 56a. When the first terminal 40 is moved upwardly a sufficient distance, tabs 60 on the C-shaped support element 58 abut the planar support portion 34, and are snapped into place along the topside 36 of the planar support portion 34.

The fuse holders 42, 48, and 50 (see FIGS. 6 and 7) are also snapped into place along the topside of the planar support portion 34.

The fuses (not shown) that are housed within the fuse holders 42, 48, and 50 are in electrical contact with both the topside 36 of the planar support portion 34, and the first terminals 40, 44, or 46.

The invention claimed is:

1. A one-piece fusible battery clamp for a vehicular storage battery, comprising a clamp portion and a spaced-apart, bolt-free planar support portion; the planar support portion having a topside and an underside; the topside of the planar support portion being sufficiently large to support at least one first terminal for accommodating a fuse holder, and at least one second terminal; and the planar support portion further being configured to permit contact along the majority of its underside portion with an adjacent, corresponding planar support wall.

2. The one-piece fusible battery clamp of claim 1, wherein the corresponding planar support wall is the surface of a vehicular storage battery.

3. The one-piece fusible battery clamp of claim 1, wherein the corresponding planar support wall is an under-hood automotive surface.

4. The one-piece fusible battery clamp of claim 1, further comprising at least one orifice on the planar support portion.

5. The one-piece fusible battery clamp of claim 1, wherein the first terminal is a threaded rod.

6. The one-piece fusible battery clamp of claim 1, wherein the first terminal is made of a conductive metal.

* * * * *